US009957136B2

(12) United States Patent
Hawkins et al.

(10) Patent No.: US 9,957,136 B2
(45) Date of Patent: May 1, 2018

(54) GUIDE RAIL STRAIGHTNESS MEASURING SYSTEM FOR ELEVATOR INSTALLATIONS

(71) Applicants: Giovanni Hawkins, Helsinki (FI); Pekka Kilpeläinen, Oulu (FI)

(72) Inventors: Giovanni Hawkins, Helsinki (FI); Pekka Kilpeläinen, Oulu (FI)

(73) Assignee: Kone Corporation, Helsinki (FI)

( * ) Notice: Subject to any disclaimer, the term of this patent is extended or adjusted under 35 U.S.C. 154(b) by 534 days.

(21) Appl. No.: 14/622,160

(22) Filed: Feb. 13, 2015

(65) Prior Publication Data

US 2015/0217972 A1   Aug. 6, 2015

Related U.S. Application Data

(63) Continuation of application No. PCT/EP2012/069649, filed on Oct. 4, 2012.

(51) Int. Cl.
*B66B 1/34* (2006.01)
*B66B 3/00* (2006.01)
*B66B 7/12* (2006.01)
*G01C 15/10* (2006.01)
*B66B 19/00* (2006.01)

(52) U.S. Cl.
CPC .......... *B66B 7/1246* (2013.01); *B66B 19/002* (2013.01); *G01C 15/10* (2013.01); *B66B 19/007* (2013.01)

(58) Field of Classification Search
CPC ... B66B 7/1246; B66B 19/002; B66B 19/007; G01C 15/10
USPC ........................................................ 187/393
See application file for complete search history.

(56) References Cited

U.S. PATENT DOCUMENTS

| 7,654,006 B1* | 2/2010 | Mooney | G01B 11/272 |
| | | | 33/286 |
| 2006/0059700 A1* | 3/2006 | Sun | G01C 15/00 |
| | | | 33/366.24 |
| 2011/0067252 A1* | 3/2011 | Van Der Meijden | B66B 19/002 |
| | | | 33/404 |

FOREIGN PATENT DOCUMENTS

GB    1015041 A    12/1965
WO    WO-9323323 A1    11/1993

OTHER PUBLICATIONS

International Search Report PCT/ISA/210 for International Application No. PCT/EP2012/069649 dated Jul. 3, 2013.
(Continued)

*Primary Examiner* — Jeffrey Donels
(74) *Attorney, Agent, or Firm* — Harnes, Dickey & Pierce, P.L.C.

(57) ABSTRACT

The invention relates to an elevator guide rail straightness measuring system, for measuring the straightness of elevator guide rails, which measuring system comprises at least one plumb line mounted vertically in the runway adjacent to the guide rail and at least one sensor arrangement to be mounted on a carrier to travel vertically along the guide rail, which sensor arrangement comprises a frame, at least one guide shoe connected to the frame for sliding/rolling along a guide surface of the guide rail, a bias means for placing and biasing the frame against the guide surface, and at least one sensor means for sensing the position of the plumb line with respect to the frame, such elevator system allows easy and exact measurement of the guide rail straightness. The invention also relates to an elevator having such a system.

15 Claims, 4 Drawing Sheets

(56) References Cited

OTHER PUBLICATIONS

Figure 1:
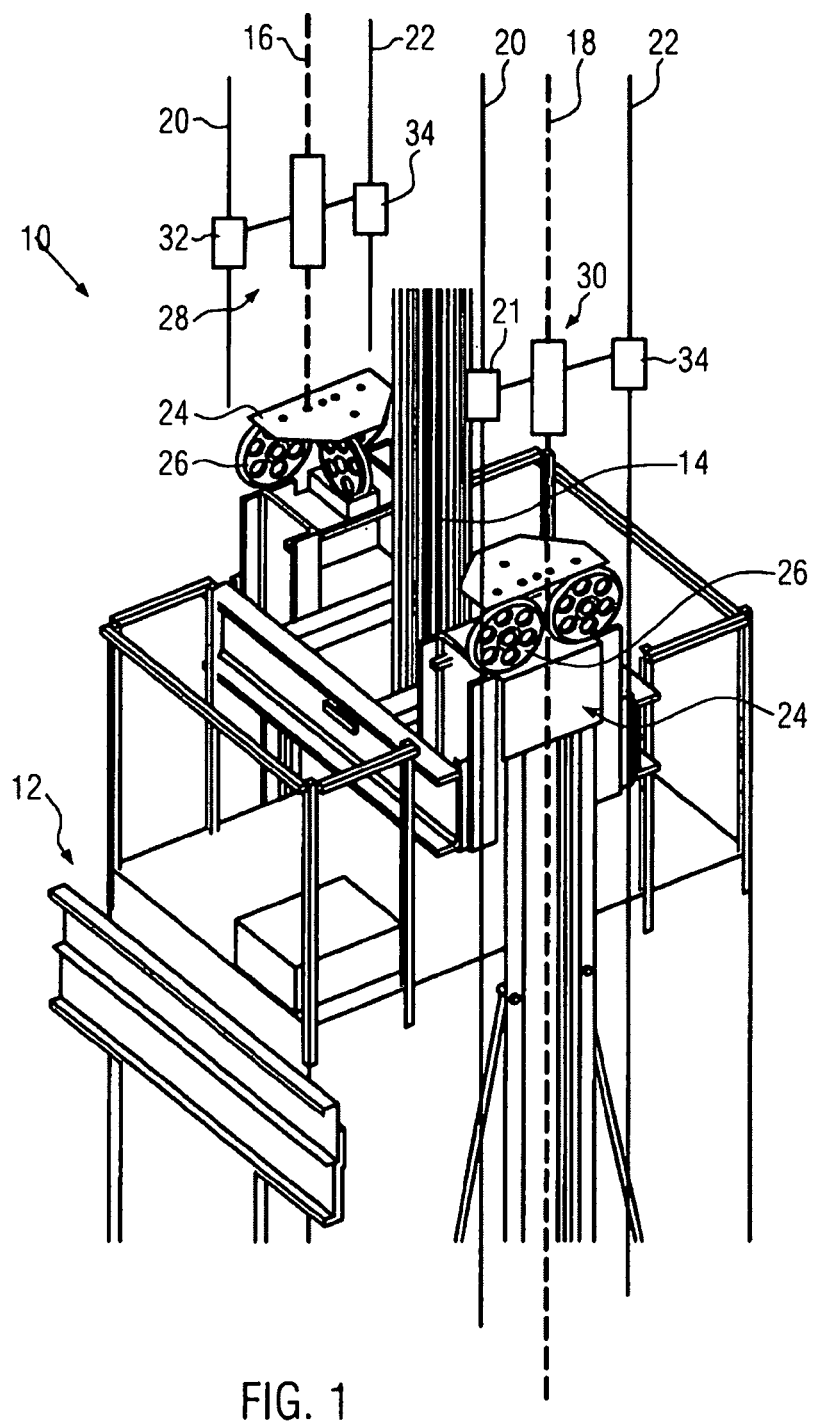

Written Opinion of the International Searching Authority PCT/ISA/237 for International Application No. PCT/EP2012/069649 dated Jul. 3, 2013.

* cited by examiner

GUIDE RAIL STRAIGHTNESS MEASURING SYSTEM FOR ELEVATOR INSTALLATIONS

This application is a continuation of PCT International Application No. PCT/EP2012/069649 which has an International filing date of Oct. 4, 2012, the entire contents of which are incorporated herein by reference.

The invention relates to a measuring system for the installation and maintenance of guide rails to achieve an exact vertical alignment of the guide rails in elevators. Currently guide rails are mounted in the elevator shaft under use of plumb lines or lasers. The persons installing or maintaining the guide rails compare the run of the guide rails with respect to the plumb lines or lasers visually. The exact alignment is dependent on the experience and skill of the installation or maintenance personal. The exact vertical alignment of the guide rails is a crucial feature for the ride comfort in the elevator and for the wear of components.

It is object of the invention to provide an elevator guide rail straightness measuring system which allows the measuring of the straightness of the elevator guide rails in an accurate and easy manner. The invention shall further facilitate the arrangement or rearrangement of guide rails in an exact vertical alignment.

According to the invention this object is solved with an elevator guide rail straightness measuring system. The object is further solved with an elevator according to example embodiments. The exact vertical alignment of guide rails is realized via a method according to example embodiments. Preferred embodiments of the invention are subject matter of the corresponding claims.

The measuring system of the invention uses at least one plumb line which is used by a sensor arrangement moving vertically along the guide rail as a reference for an exact straight orientation of the guide rail in the runway. On this behalf the sensor arrangement is mounted to a carrier, e.g. to the elevator car or to a counterweight, if present, or to a temporary installation platform which is used during the installation of the elevator. The sensor arrangement comprises a frame with a guide shoe and a biasing means which keeps the frame fixed to the guide rail and the guide shoe in contact with the guide surface(s) of the guide rail. The frame carries the sensors which measure the distance of the frame in both horizontal directions with respect to the plumb line. When now the sensor arrangement travels with the carrier along the guide rail in vertical direction an easy straightness check can be performed. The sensor arrangement detects automatically each deviation of the guide rail run from an exact vertical alignment as referenced by the plumb line. This check can be made for different guide surfaces of the guide rail separately. With this enhanced and automatic position data of the measuring system the guide rails can be rearranged immediately, e.g. in course of the guide rail installation or the data can be used for a later rearrangement of guide rails, e.g. in course of a later installation step or during maintenance.

The system can be established at the building site and can be removed after the installation has been approved. It is of course possible—even less feasible—to leave the system in the elevator to provide the possibility of straightness checks during the operation of the elevator.

Accordingly, this system of the invention is a tool that electronically compares guide rails to vertical plumb lines, in particularly under following conditions:

(1) during installation of the elevator using a temporary installation platform on a partly installed shaft. The positions of the brackets are pre-mounted visually with the help of plumb lines, but are verified and corrected with the aid of the electronic measuring system.

(2) after installation is completed—full shaft and fully installed car (3) to monitor guide line accuracy on a complete elevator after building creep (4) to survey an old elevator shaft as part of the tender repair process.

The measurements from the sensors can be stored on a data logger or can be forwarded straight to a laptop for being processed immediately or later on.

The measurement system for measuring the straightness of the guide rails can be applied during the installation and/or afterwards during the operation of the elevator.

The sensor arrangement comprises a frame having at least one guide shoe comprising at least one sliding surface or roller for sliding or rolling along a guide surface of the guide rail to keep the frame of the sensor arrangement in close contact to the guide rail. The guide shoe may thus have a sliding surface or at least one roller being in contact with the guide surface of the guide rail. Via this arrangement deviations of the guide rail straightness are measured as variations in the distance between the plumb line and the guide shoe over the shaft length.

Further, the sensor arrangement has a bias means for biasing the guide shoe against the guide surface which is necessary to maintain the contact of the guide shoe on the guide surface of the guide rail during the entire run of the elevator car along the length of the runway. Only if the guide shoe is in continuous contact with the guide surface it is possible to exactly measure deviations of the guide surface from a vertical straight line along the runway.

Furthermore, the sensor arrangement comprises at least one sensor for sensing the position of the plumb line with respect to the frame of the sensor arrangement. The measurement data of the sensor give exact information in how far the guide rail or a guides surface thereof deviate(s) from an exact vertical orientation as referenced by the plumb line.

The invention further relates to an elevator arrangement comprising the above mentioned measuring system. The elevator arrangement may be an arrangement which is used during the installation of an elevator. This arrangement comprises an elevator runway, e.g. an elevator shaft, at least one elevator car and/or a temporary installation platform configured to move vertically in the elevator runway along at least one guide rail which extends vertically along at least a part of the runway, whereby the car or counterweight or the temporary installation platform operates as carrier for the sensor arrangement of the measuring system. The arrangement further includes at least one plumb line fixed vertically in the elevator runway between its upper and lower end. Such an arrangement allows the installation of elevator guide rails, whereby the vertical alignment of the guide rails can be immediately corrected with the help of the electronic straightness measuring system before the elevator is put into use, even before the elevator car is installed at the guide rails.

The invention further relates to a method for building up elevator guide rails under use of a measuring system as mentioned above. In this method single guide rails lengths are pre-mounted in the elevator shaft by visually aligning the guide rails along plumb lines located vertically in the elevator shaft. The guide rail lengths are thereby fixed one above the other to the elevator runway via brackets which allow an adjustment of the mounting location of the guide rail lengths in the horizontal plane. After this pre-mounting of the guide rail lengths the sensor arrangement is moved along the guide rails via a temporary installation platform or the finished or unfinished elevator car. Now the sensor arrangement which is driving with the temporary installation platform along the guide rails provides exact data regarding the straightness and the vertical alignment of the single guide rail lengths. Now, the positions of the guide rail lengths can be manually or automatically corrected in line with the data provided by the measuring system by opening the bracket of the corresponding guide rail length, readjusting it in line with the data of the sensor arrangement and fixing the brackets so that the guide rail lenghts are fixed in their final mounting positions one above the other so as to build an exactly aligned guide rail.

In this case it is also possible to avoid the provision of a temporary installation platform if the elevator car is used as carrier for the sensor arrangement. Preferably, in this case the car is used before it is completely finalized. Via this measure the weight of the unfinished car may be essentially lower than after being read for use, considered the weight of heavy decorative interior, e.g. marble linings.

In one embodiment of the invention the measuring system may also be used after the elevator installation has been finalized. In this case the plumb lines as well as the sensor arrangement remain in the elevator runway. Accordingly, the elevator control could be configured to run a straightness monitoring drive wherein the elevator car runs from its upper most position to its lower most position or vice versa and measures via the sensor arrangement the straightness of the guide rails with respect to the plumb lines. With the measured data the elevator company is able to determine at which time guide rails have to be reworked or replaced. In this case the monitoring arrangement might comprises a data interface for issuing the measured data to an elevator control or to a remote monitoring station where the function of the elevator is monitored and maintenance actions can be taken. Thus, by the elevator control a test run, preferably with empty car can be initiated. The control then gets the measurement data and correlates this data with the car position from the elevator system. By this measure the exact position of any guide rail failures can be exactly determined.

Preferably the sensor arrangement comprises sensors capable of monitoring the variation of horizontal distance from the guide shoe to the plumb lines as described below and a vertical position encoder, which may comprise at least one wheel running along the guide rail to provide position data of the sensor arrangement with respect to the guide rail. The data provided by the sensor giving information about the horizontal displacement of a guide rail surface with respect to the plumb line is synchronized with the car position from encoder. By this measurement the exact position of any guide rail failures can be exactly determined. It is also possible to simply provide a memory in connection with the sensor arrangement. In said memory the measurement data can be stored, e.g. as data relating to the position of the car or as data relating to the time of travel of the car (which allows the calculation of its position). This solution enables simple and reliable measuring and monitoring of the guide rail straightness during the installation or operation of the elevator.

During the installation phase the single guide rail lengths are installed sequentially from a temporary installation platform onto brackets which are fixed to the shaft wall. At each guide rail installation, these guide rail lengths are aligned by eye to the plumb line, but can then be electronically checked by the invention. Further it is possible to immediately reposition of the guide rail lengths to a more accurate locations to achieve an exactly aligned guide rail.

After installation the completed guide rail straightness can be audited by carrying the sensor arrangement on the car roof and measuring the horizontal deviation of the guide rail surface(s) from the plumb line combined with the vertical position as explained above.

This procedure can also be performed in the initial years following installation to monitor any displacement of the rails due to building shrinkage. Furthermore this survey can be performed in buildings due to be modernized apart of the modernization tendering process.

It is also possible to simply provide a memory in the sensor arrangement. In said memory the measurement data can be stored, e.g. as data relating to the position of the car or as data relating to the time of travel of the car (which allows the calculation of its position). This solution enables simple and reliable monitoring of the guide rail straightness at a desired time after the measurement has been done.

The invention is particularly configured for high rise elevators having a shaft length of more than 20 meters, particularly 50 meters or more. In these high elevator shafts lasers beams can hardly be used as the diffusion of a laser beam prevents an exact measurement over a longer distance than a few 10 meters.

Therefore, the invention provides plumb lines which are located temporarily or permanently in the elevator runway, usually in the elevator shaft. Thus, it is also possible to perform measurements regarding the arrangement of other elevator components in the shaft during operation of the elevator, e.g. the landing doors etc.

The invention is important for realizing an exact straightness of the guide rails particularly in high rise elevators where the travel comfort particularly at higher car velocities is an essential item. With the inventive measuring system not only installation errors can be avoided, but—if used after installation—also damages of the guide surface of the guide rails can be traced, e.g. based on the actions of gripping devices in an emergency case, but also twists of the guide rails, e.g. caused by internal material tensions of the shaft itself, which may twist and bend the rails locally between the brackets The sensors are kept at an initial fixed distance from the plumb lines by the frame of the sensor arrangement having a horizontally adjustable support for the sensors. The support is preferably adjustable in both horizontal directions.

The bias means of the invention could be any spring loaded device which is able to keep the guide shoe in contact with the guide rail. A preferred contactless bias means comprises at least one magnet which is connected to the frame of the sensor arrangement in the very vicinity of the guide rail surface so that the frame keeps in contact with the guide rails via the magnetic force between the guide rail and the magnet(s) of the guide shoe. The further advantages of this bias means is that it does not lead to any wear on the bias means or on the guide rails, takes only minor space and very reliably keeps the guide shoe in contact with the guide surface of the guide rail.

The sensors for sensing the position of the plumb line with respect to the guide shoe can be contact-based sensors or contact-less sensors as e.g. optical sensors. In a very simple and economic solution the sensor is a rotary encoder having an arm which is in contact with the plumb line. By providing two of these rotary encoders, preferably arranged perpendicular to each other, it is possible to exactly determine the position of the plumb line with respect to the guide shoe in a horizontal plane.

Preferably, an optical sensor is used which has the advantage that no contact with the plumb line is necessary to determine its position which keeps the plumb line itself untangled by the operation of the sensor. The results are therefore still more exact than with contact-based methods. Also in this case preferably two sensors are provided perpendicularly to each other so that the position of the plumb line in a horizontal plane can be exactly determined.

In case optical sensors are used, preferably sensors with a parallel light source, e.g. with a linear light source array, are used. The benefits of using a line sensor with a parallel light source are:
- The shape of the measurement area is more convenient (e.g. rectangular 24*24 mm), resulting a more compact size of the sensor head.
- The size of the shadow of the wire doesn't change, when the distance from the light source changes. This results in very simple calculations.
- The resolution of the detection is improved.

The sensors may preferably either comprise a parallel light source in the detection area opposite to the detector array in which case the shadow of the plumb line is detected or the sensors are based on the reflexion principle in which case the detectors are located on the same side as the parallel light source. In the latter case the light reflected by the plumb line is detected.

In a preferred embodiment of the invention the guide shoe comprises at least one roller which is connected to a second rotary encoder to provide car position data. For example the elevator car can be driven to its upper most or lower most position to start a test run for the straightness of the guide rail. After having reached this position an elevator control may set the position to zero. Starting from here the elevator car runs to its extreme position on the opposite end of the runway. During that run not only the position of the plumb line with respect to the guide shoe is measured but also via the second rotary encoder the revolutions of the roller on the guide surface which again gives detailed information about the actual car position. Of course, (but not practically) this information can also be retrieved from the elevator system itself or via the time which the car needs to progress on its path. By comparing the traveling time with reference data the exact car position can be retrieved. Hereby, it has to be considered that the test run should always be made with an empty car, so that the environmental conditions of the monitoring run are always the same. Further, in this preferred embodiment no data connection to the elevator system has to be established to get all the necessary information, i.e. the position data of the car.

Preferably, the sensor means has two sensors which are located perpendicular to each other whereby the measurement direction of both sensors extends horizontally. Via this arrangement of the sensors in the sensor means the exact position of the plumb line with respect to the guide shoe can be measured in a horizontal plane.

In a preferred embodiment of the invention the monitoring arrangement has a sensor arrangement on each guide rail side of the car. Further, for one guide rail two sensor arrangements can be provided acting on different guide surfaces of the guide rail. By providing two sensor means for the different guide surfaces of the guide rail any twist of the guide rail can easily be detected, but a second measurement of the straightness gives better measurement accuracy Preferably in this case one plumb line is provided for each sensor means of a sensor arrangement. This makes it possible to keep the plumb line in close relationship to the corresponding sensors and thus improves the exactness of the position measurements of the plumb line with respect to the guide shoe.

In a preferred embodiment of the invention the sensor arrangement is mounted on the top of the elevator car. This solution has the advantage that it can be serviced quite easily during installation or regular maintenance of the elevator. Furthermore, this arrangement does not affect the normal operation of the elevator essentially. However, as mentioned before, the primary purpose of this device is as a measurement tool which can be quickly mounted and dismounted and transported to other installation sites.

Preferably, the sensor arrangement has an interface for a connection with data logger or pc. It is thus possible to store all measurement data of the sensors, optionally together with correlated position data of the car or time data of a monitoring run in a memory of the sensor arrangement, which memory could preferably be detachable to allow the data processing elsewhere, e.g. in a remote center of the elevator company.

Alternatively the sensor arrangement has an interface for a connection with an elevator control. This would be particularly useful in providing feedback for an active roller By this means it is possible to coordinate all necessary actions for the measurement of the straightness of the guide rail. For example can the elevator control perform a special straightness test run with an empty elevator car which necessitates a coaction of the monitoring arrangement and the elevator drive. Accordingly all this actions, i.e. the drive of the elevator car as well as the operation of the monitoring arrangement can be coordinated by the elevator control which could also be an elevator group control or a multi group control.

Preferably, the sensor arrangement has a processing unit comprising a memory for reference data. The processing unit further has preferably a comparator for comparing the actual measurement data of the sensor with reference data or a threshold value. The measurement values can also comprise integrated or differentiated values over the length of the guide rail to reduce or to enhance the determination of deviations in the guide surface over the guide rail length.

The advantage of this embodiment is that the processing unit is further configured to issue a signal if the actual measurement data exceed the reference data and/or a set threshold value. In this case the monitoring arrangement does not only provide the measurement data but also issues a signal which indicates to the installation supervisor or maintenance supervisor that corrective or maintenance action is to be performed to improve the straightness of the elevator guide rails and accordingly the ride comfort and safety of the elevator.

Preferably the sensor arrangement comprises a first adjustment bar mounted to the frame of the sensor arrangement, and a first adjustment block which is fixable in a desired position on said first adjustment bar, as well a second adjustment bar mounted to the first adjustment block, to which second adjustment bar a second adjustment block is fixable in a desired position along the second adjustment bar, which second adjustment block carries the sensor means. This arrangement forms a support for the sensor means which allows an easy adjustment of the sensor means with respect to the frame of the sensor arrangement such that the plumb line lies optimal in the detection area of the sensor(s) of the sensor means.

The position adjustment of the sensor means can be improved in said arrangement if the second adjustment bar is perpendicular to the first adjustment bar, thus allowing optimal adjustment in the direction of the two Cartesian coordinates A,B in the horizontal plane.

Preferably, the sensor means comprises a horizontal support frame carrying two sensors, which support frame surrounds the plumb line. This placement of the sensors on the frame allows a rigid fixation of the sensors with respect to each other as well as with respect to the guide shoe. Further, the support frame can limit the detection area of the sensors which reduces the danger of detection failures caused by external influence, as e.g. light beams in the elevator shaft. By surrounding the plumb line the support frame provides a secure and defined detection area of the sensor(s).

Preferably, the frame consists of an angle profile extending with its profile axis along the guide rail, so that it covers two perpendicular guide surfaces thereof, which profile carries on its sides facing the guide surfaces of the guide rail mountings supporting rollers running along the guide surfaces as well as magnets working as bias means. This configuration of the frame builds a rigid base for the rollers and the bias means as well as for the mounting of the sensor means. Further, this frame can easily be fixed to an elevator car or counterweight.

The elevator according to the invention has at least one plumb line which is mounted vertically and permanently in the runway adjacent to the guide rails. The runway is usually an elevator shaft. Anyway, there are also installations where elevators run without a shaft, e.g. at the outer wall of a building.

The above mentioned preferred embodiments may be combined which each other arbitrarily as long as this is technically possible.

The invention is now described with respect to the enclosed figures.

Figure 2:
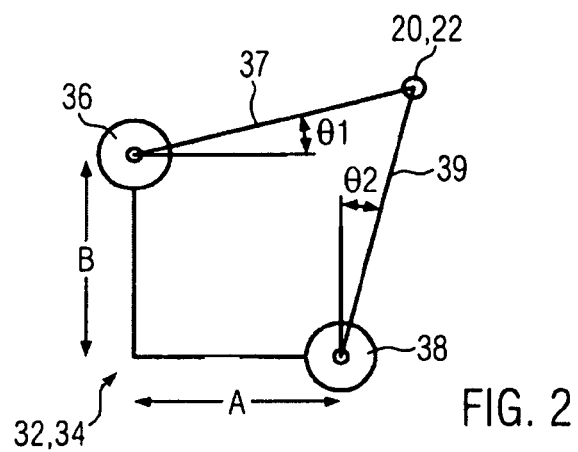
Figure 3:
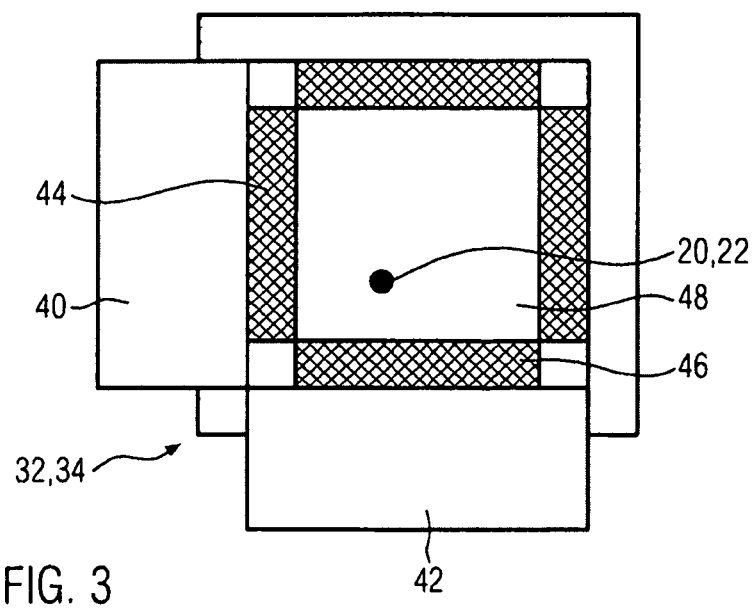
Figure 4:
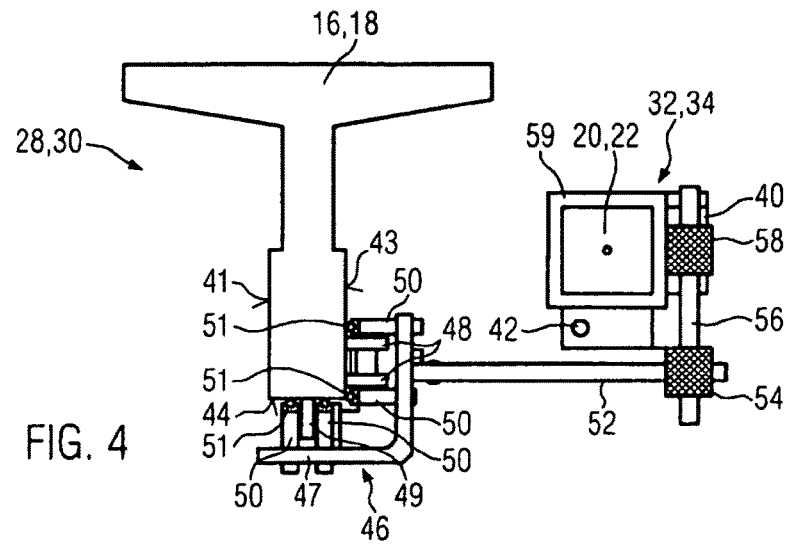
Figure 5:
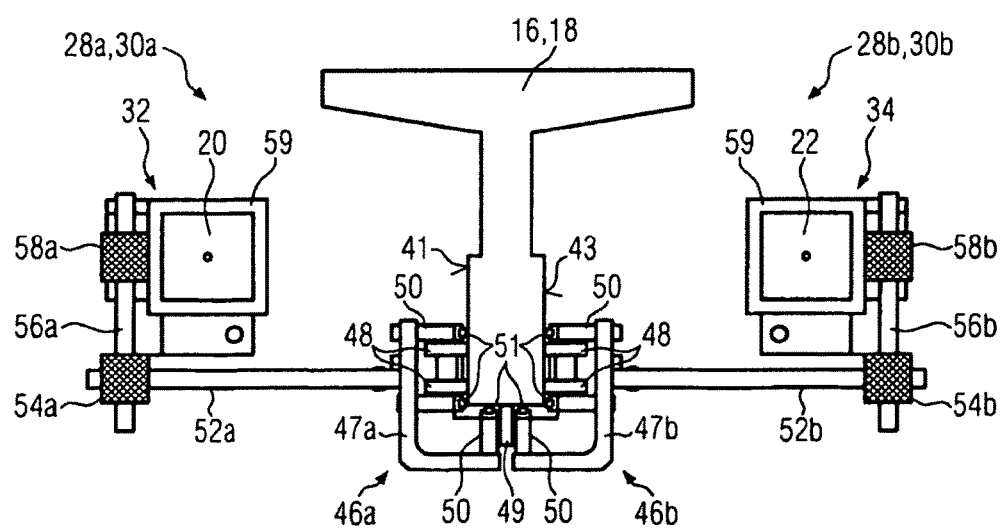
Figure 6:
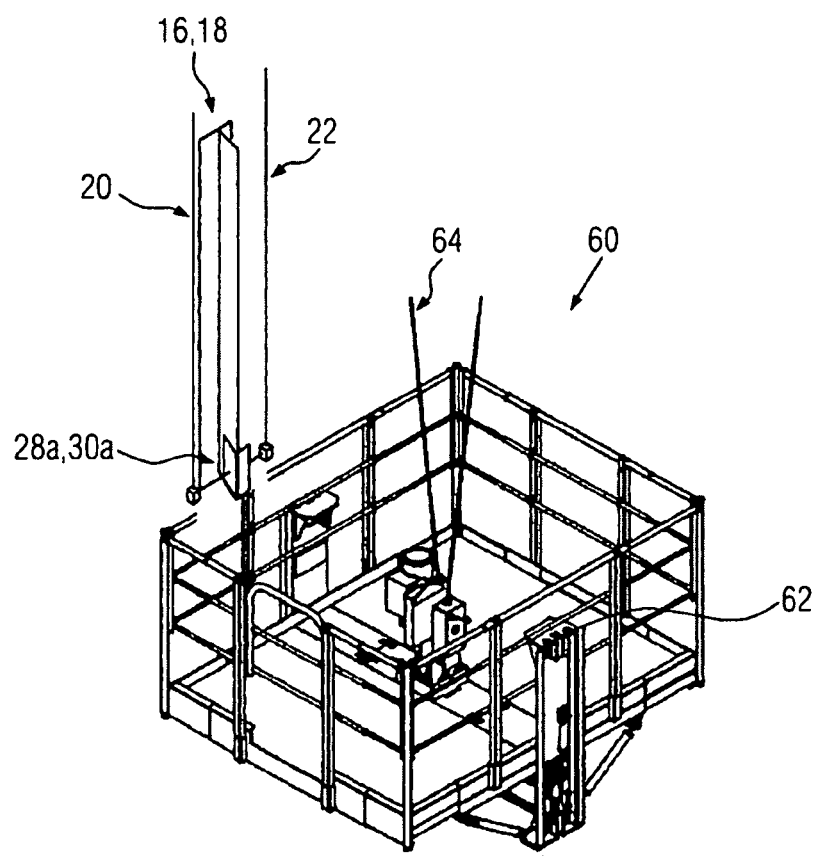

FIG. 1 shows a perspective diagram of an elevator car having sensor arrangements for each guide rail, FIG. 2 shows a schematic diagram of a sensor arrangement with two rotary encoders, FIG. 3 shows a schematic diagram of a sensor arrangement having two optical sensors, FIG. 4 shows a cross-sectional view through an elevator guide rail and a sensor arrangement with one plumb line, FIG. 5 shows a cross-sectional view through an elevator guide rails with two sensor arrangements and two plumb lines, and FIG. 6 shows a perspective diagram of an installation platform having sensor arrangements on both sides.

FIG. 1 shows an elevator 10 having an elevator car 12 suspended by hoisting ropes 14 and running in an elevator shaft along elevator guide rails 16, 18 (only schematically shown). Adjacent to both guide rails 16, 18 plumb lines 20, 22 are vertically mounted in the runway on both sides of the guide rails. The plumb lines are fixed in the top and in the bottom of the elevator shaft (not shown). On top of the car 12 elevator guide shoes 24 are provided comprising rollers 26 for guiding the elevator car 12 along the car guide rails 16, 18. On top of the elevator car 12 two sensor arrangements 28, 30 are mounted on both opposite sides of the elevator car 12 adjacent the guide rails 16, 18. The sensor arrangements may be mounted on the car during installation of the elevator or later on during a check of the guide rail straightness. Each sensor arrangement 28, 30 comprises a first sensor means 32 for the first plumb line 20 and a second sensor means 34 for the second plumb line 22. The sensor arrangements 28, 30 with the first and second sensor means 32, 34 measure the exact mutual position of the first and second plumb line 20, 22 with respect to a guide shoe (shown in FIGS. 4 and 5) arranged in the sensor arrangement 28, 30 and being in contact with the guide rails 16, 18.

The sensor arrangement 28, 30 can be embodied as it is described in connection with FIGS. 4 and 5 whereas the first and second sensor means 32, 34 can be embodied as it is shown in FIGS. 2 and 3.

FIG. 2 shows a first embodiment of a first and second sensor means 32, 34.

Each of the first and second sensor means has two sensors which are embodied in FIG. 2 as rotary encoders 36, 38 each having an arm 37, 39 which is in contact with the plumb line 20, 22. Both rotary encoders 36, 38 measure the angle $\Theta$ 1, $\Theta$ 2 with respect to the Cartesian coordinates A, B in the horizontal plane which allows the measurement of the exact position of the plumb lines 20, 22 with respect to the guide shoe of the sensor arrangement 28, 30.

In FIG. 3 the first and second sensor means 32, 34 have two optical sensors 40, 42 with parallel light beams which are arranged perpendicular to each other in a horizontal plane whereby the first optical sensor 40 emits a first detection beam 44 consisting of a plurality of small parallel detection beams and the second optical sensor 42 emits a second parallel detection beam 46 perpendicular to the first one. In the area 48 where the two detection beams 44, 46 cross the location of the plumb line 20, 22 can reliably be identified in the horizontal plane. The sensors either comprise a light source in the detection area opposite to the detector array in which case the shadow of the plumb line is detected or the sensors are based on the reflexion principle in which case the detectors are located on the same side as the parallel light source, in which case the light reflected by the plumb line is detected. The figure shows sensors based on the reflexion principle.

FIG. 4 shows a sensor arrangement 28, 30 with one sensor means 32, 34 whereas FIG. 5 shows a sensor arrangement 28, 30 with two sensor means 32, 34 corresponding to the arrangement in FIG. 1. The guide rail 16, 18 comprises two parallel opposite guide surfaces 41, 43 and a third guide surface 44 located between the two parallel guide surfaces and perpendicular to these. The sensor arrangement comprises a guide shoe 46 having a body consisting of an angular profile 47 extending with its profile axis vertically, i.e. along the guide rail. The angular profile carries on its side facing two perpendicular guide surfaces 42, 44 mountings 50 for guide rollers 48, 49 rolling along said guide surfaces 42, 44. The mountings further support at their ends facing the guide surfaces 42, 44 magnets 51 which are thus located in direct proximity to the guide surfaces 42, 44 of the guide rails 16, 18. These magnets 51 are bias means to keep the guide shoe 46 and accordingly the rollers 48, 49 of the guide shoe in contact with the guide surfaces 42, 44 of the guide rails 16, 18 because of the magnetic force of the magnets acting on the guide rail. The guide shoe 46 further includes a first adjustment bar 52 extending horizontally to which a first adjustment block 54 is fastened, which first adjustment block 54 carries a second adjustment bar 56 perpendicular to the first one, which second adjustment bar 56 carries a second adjustment block 58 which finally supports he second sensor means 32, 34. The sensor means 32, 34 comprises a support frame 59 to which a first and second sensor 40, 42 are mounted which correspond to the embodiment of FIG. 3 (optionally also according to FIG. 2 in case of the use of rotary encoders 36, 38 as sensors). The sensor means 32, 34 is arranged that way that the plumb line 20, 22 is located in the center of the support frame 59. The roller 49 rolling on the guide surface 44 of the guide roller may have a rotary encoder to provide position data of the position of the sensor arrangement with respect to the guide rail.

The sensor arrangement 28, 30 is moved together with the elevator car and is thus able to determine the exact position of the plumb line 20, 22 with respect to the guide surfaces 42, 44 to which the guide shoe 46 is fastened.

In FIG. 5 the sensor arrangement 28, 30 is mostly identical to FIG. 4 but comprises a first sensor means 32 and a separated second sensor means 34 which are located on separate guide shoes 46a, 46b. This arrangement is able to check the straightness of both opposite guide surfaces 41, 43 of the guide rails 16, 18. This arrangement can also determine variations in the thickness of the guide rails 16, 18 between the parallel guide surfaces 41, 43 as well as a twist of the guide rail.

FIG. 6 shows a temporary installation platform 60 as used during the installation of the elevator. The platform 60 comprises guide shoes 62 to guide the platform along guide rails 16, 18, as far as these are already established in the elevator runway. The platform further comprises a hoist 64 to be movable in the elevator runway. The platform further comprises a sensor arrangement, which may be the sensor arrangement 28, 30 of FIG. 4 or the sensor arrangement 28a, 30a of FIG. 5 to allow a final alignment of the guide rails during the installation of an elevator. Thus, the guide rail lengths being arranged on top of each other are pre-mounted whereby they are visually aligned with the plumb lines and pre-fixed via brackets which allow an adjustment of the guide rail lengths in the horizontal plane. After pre-mounting of the guide rail lengths the temporary installation platform moves with the sensor arrangement(s) along the pre-mounted guide rails formed by the aligned guide rail lengths. The guide rail lengths can then be adjusted to the correct position in line with the data of the sensor arrangement by successively loosening a bracket, rearranging the guide rail length and fixing it in the final exactly aligned position. Accordingly, the invention allows an easy installation of exactly aligned guide rails which leads to elevators with less wear and better travel comfort, particularly in high rise and/or fast elevators.

The above embodiments can be combined with each other arbitrarily as long as this is not technically excluded. The invention can be varied within the scope of the appended patent claims.

The invention claimed is:

1. A measuring system configured to measure a straightness of an elevator guide rail, the measuring system comprising:
   at least one plumb line mounted vertically in an elevator runway adjacent to a guide rail;
   at least one sensor arrangement on a carrier to travel vertically along the guide rail, the sensor arrangement including,
      a frame,
      at least one guide shoe connected to the frame, the guide shoe configured to move along a guide surface of the guide rail,
      a biasing device configured to bias the frame against the guide surface, and
      at least one sensor configured to sense a position of the plumb line with respect to the frame; and
   at least one temporary installation platform configured to transport the sensor arrangement along the guide rail.

2. The measuring system according to claim 1, wherein the sensor arrangement further comprises:
   a data interface and an internal memory.

3. The measuring system according to claim 1, wherein the bias device comprises:
   at least one magnet configured to bias the frame against the guide surface.

4. The measuring system according to claim 1, wherein the at least one sensor includes a first rotary encoder and a second rotary encoder, and the frame comprises:
   a roller having the second rotary encoder attached thereto, the second rotary encoder configured to provide car position data.

5. The measuring system according to claim 1, wherein the sensor comprises:
   two sensors, each of the two sensors being one of a rotary encoder and an optical sensor, the two sensors configured to determine the position of the plumb line with respect to the frame.

6. The measuring system according to claim 1, wherein the at least one sensor arrangement includes two sensor arrangements acting on different guide surfaces of the guide rail.

7. The measuring system according to claim 6, wherein one plumb line is provided for each of the two sensor arrangements.

8. The measuring system according to claim 1, wherein the frame has an L-profile carrying a first adjustment bar, and the sensor arrangement further comprises:
   a first adjustment block which is fixable in a desired position on said first adjustment bar, and
   a second adjustment bar mounted to the first adjustment block, the second adjustment bar configured to fix a second adjustment block in a desired position along the second adjustment bar, the second adjustment block having the sensor attached thereto.

9. The measuring system according to claim 1, wherein the sensor includes two sensors, and
   the sensor arrangement includes a support frame surrounding the plumb line, the support frame configured to carry the two sensors.

10. The measuring system according to claim 1, wherein the biasing device includes magnets configured to bias the frame against the guide surface, and the frame comprises:
    an angle profile extending with its profile axis along the guide rail, the angle profile configured to,
       cover two perpendicular guide surfaces of the guide rail, and
       carry mountings for supporting rollers running along the guide surfaces and the magnets.

11. The measuring system according to claim 1, wherein the sensor arrangement comprises:
    an interface configured to connect with an elevator control or a data logger.

12. The measuring system according to claim 1, wherein the sensor arrangement comprises:
    a processor and a memory, the memory configured to store reference data, the processor configured to,
       compare position data of the sensor with reference data, and
       issue a signal if the position data exceeds the reference data by a threshold value.

13. An elevator arrangement comprising:
    at least one temporary installation platform configured to move vertically in an elevator runway along a guide rail to transport at least one sensor arrangement along the guide rail, the guide rail configured to extend vertically along at least a part of the elevator runway; and
    a measuring system configured to measure a straightness of the guide rail, the measuring system including at least one plumb line mounted vertically in the elevator runway adjacent to the guide rail, and the at least one sensor arrangement, the at least one plumb line being fixed vertically in the elevator runway between an upper end and a lower end of the elevator runway, and the at least one sensor arrangement including,
  a frame,
  at least one guide shoe connected to the frame, the guide shoe configured to move along a guide surface of the guide rail,
  a biasing device configured to bias the frame against the guide surface, and
  at least one sensor configured to sense a position of the plumb line with respect to the frame.

14. The elevator arrangement according to claim 13, wherein the sensors include a parallel light source.

15. A method for building up elevator guide rails whose straightness is measured via a measuring system, the method comprising:
  mounting the elevator guide rails in an elevator shaft by visually aligning the elevator guide rails along plumb lines located vertically in the elevator shaft, and fixing, via brackets, the elevator guide rails to an elevator runway at a mounting location, the brackets configured to allow an adjustment of the mounting location of the elevator guide rails in a horizontal plane;

moving a sensor arrangement including at least one sensor along the elevator guide rails via a temporary installation platform such that the at least one sensor is transportable along the elevator guide rails via the temporary installation platform; and adjusting mounting positions of the elevator guide rails based on data provided by the measurement system, the adjusting including opening, readjusting and fixing the brackets such that the elevator guide rails are fixed at a final one of the mounting positions indicated as an exact alignment by the measuring system.

* * * * *